(12) United States Patent
Heubi, III

(10) Patent No.: US 12,133,511 B2
(45) Date of Patent: Nov. 5, 2024

(54) BIODEGRADABLE DUCK NESTING HUT

(71) Applicant: John Stewart Heubi, III, Fredericksburg, VA (US)

(72) Inventor: John Stewart Heubi, III, Fredericksburg, VA (US)

( * ) Notice: Subject to any disclaimer, the term of this patent is extended or adjusted under 35 U.S.C. 154(b) by 0 days.

(21) Appl. No.: 18/181,751

(22) Filed: Mar. 10, 2023

(65) Prior Publication Data

US 2024/0188543 A1   Jun. 13, 2024

Related U.S. Application Data

(60) Provisional application No. 63/386,963, filed on Dec. 12, 2022.

(51) Int. Cl.
*A01K 31/14* (2006.01)
*A01M 29/30* (2011.01)

(52) U.S. Cl.
CPC .............. *A01K 31/14* (2013.01); *A01M 29/30* (2013.01); *A01K 2227/30* (2013.01)

(58) Field of Classification Search
CPC ........ A01K 31/00; A01K 31/12; A01K 31/14; A01K 2227/30; A01M 29/30
See application file for complete search history.

(56) References Cited

U.S. PATENT DOCUMENTS

| | | | | |
|---|---|---|---|---|
| 2,261,360 A | * | 11/1941 | Miksa | A01M 1/18 43/108 |
| D174,139 S | * | 3/1955 | Sadler | D26/68 |
| 2,931,336 A | * | 4/1960 | Cather | A01K 39/0113 119/59 |
| 3,051,126 A | * | 8/1962 | Merritt | A01K 39/0113 119/52.3 |
| 3,090,354 A | * | 5/1963 | Merritt | A01K 39/0113 D30/128 |
| D291,257 S | * | 8/1987 | Thoeny | D30/110 |
| 4,767,088 A | * | 8/1988 | Fielder | A01K 39/0113 248/121 |
| D349,784 S | * | 8/1994 | Burns | D30/110 |
| 5,347,769 A | * | 9/1994 | Dinsmore | E01F 9/623 52/101 |
| 5,355,835 A | * | 10/1994 | Freed | A01K 39/0113 248/162.1 |
| 5,394,641 A | * | 3/1995 | Danca | A01K 39/0113 43/108 |
| D358,907 S | * | 5/1995 | Spivey | D30/110 |
| 5,642,687 A | * | 7/1997 | Nylen | A01K 39/0113 119/52.3 |

(Continued)

FOREIGN PATENT DOCUMENTS

DE   19545323 A1 * 6/1997 ............. A01K 31/14
FR   2614174 A1 * 10/1988

*Primary Examiner* — Monica L Perry
*Assistant Examiner* — Aaron M Rodziwicz
(74) *Attorney, Agent, or Firm* — Dunlap Bennett & Ludwig PLLC

(57) ABSTRACT

A biodegradable duck nesting system includes a first member having a hollow interior, and a second member disposed in the first member. The system includes a biodegradable hollow enclosure having an opening sized to allow a duck to enter and/or exit the enclosure. The system also includes a predator prevention member located below the enclosure for preventing predators from contacting the enclosure.

13 Claims, 10 Drawing Sheets

(56) References Cited

U.S. PATENT DOCUMENTS

| | | | | |
|---|---|---|---|---|
| 5,826,542 | A * | 10/1998 | Allen | H02G 7/00 |
| | | | | 119/57.9 |
| 5,878,537 | A * | 3/1999 | Flischel | A01K 39/0113 |
| | | | | 119/52.3 |
| 6,098,348 | A * | 8/2000 | Weaver | A01K 39/0113 |
| | | | | 52/745.13 |
| 6,986,322 | B2 * | 1/2006 | Lumpkin | A01K 39/0113 |
| | | | | 119/52.3 |
| 8,104,430 | B1 * | 1/2012 | Powell, Jr. | A01K 39/0113 |
| | | | | 119/52.3 |
| 8,413,605 | B2 * | 4/2013 | Baynard | A01K 39/0113 |
| | | | | 119/52.3 |
| 10,349,634 | B2 * | 7/2019 | Rawls | A01K 39/0113 |
| 11,172,653 | B1 * | 11/2021 | Reed | A01K 39/0113 |
| 2002/0195061 | A1 * | 12/2002 | Sonnek | A01K 31/14 |
| | | | | 119/428 |
| 2005/0132972 | A1 * | 6/2005 | Scott | A01K 31/14 |
| | | | | 119/431 |
| 2009/0139460 | A1 * | 6/2009 | Sonnek | A01K 31/14 |
| | | | | 119/435 |
| 2010/0175627 | A1 * | 7/2010 | Carpenter | A61L 2/16 |
| | | | | 424/618 |
| 2022/0046899 | A1 * | 2/2022 | Zehring | A01K 39/01 |

* cited by examiner

BIODEGRADABLE DUCK NESTING HUT

CROSS REFERENCE TO RELATED APPLICATIONS

This nonprovisional patent application is based on provisional application, U.S. Ser. No. 63/386,963 filed Dec. 12, 2022, now hereby incorporated by reference in its entirety.

BACKGROUND OF THE INVENTION

The present subject matter, generally directed to a duck nest, is more particularly directed to a nesting system made of biodegradable materials easy-to-assemble and maintain, for providing an ecologically friendly cavity in which perching ducks safely nest.

BACKGROUND

"Duck" is the common name for numerous species of waterfowl in the family Anatidae. Ducks, smaller and shorter necked than swans and geese (also members of the family Anatidae), can be found on every continent except *Antarctica*. Humans have hunted ducks since ancient times. For continental North America, their breeding habitat generally includes wooded swamps, shallow lakes, marshes, ponds, and creeks within the eastern United States, the west coast of the United States, adjacent portions of southern Canada, and select west coast locations adjacent Mexico. Perching ducks usually nest in cavities in trees that are located close to water, although they will take advantage of nesting structures which are located in an assortment of wetland locations.

There are several disadvantages of using current duck nesting boxes. One disadvantage is they're permanently attached to a pole, post, or tree trunk, making them difficult to manage, repair, or replace. Without a predator shield, raccoons, mink, weasels, water snakes, house cats, opossum, and so forth can easily decimate a nest by climbing to a nesting box location. A second disadvantage of current nesting boxes is that they are made of wood and are expensive to build, and heavy and difficult to hang. Observations have shown that nesting boxes made entirely of treated wood, PVC, or metal may increase the temperature inside a nesting compartment and destroy the eggs before hatching. A third disadvantage resulting from current nesting boxes, results in insects (e.g., ants, termites, beetles, wasp, etc.) and spiders, taking up residence in boxes that aren't replaced from one nesting season to another. Another disadvantage is that nesting boxes made of shoddy materials quickly become unusable, while corrodible metal parts quickly rust with inclement weather conditions, requiring repair or replacement to ensure productive nests available for ducks. The present subject matter solves these problems.

SUMMARY OF THE INVENTION

The present subject matter provides a system that solves these problems. The system provides a lightweight and easy-to-manage duck-nesting environment, providing a safe and ecologically friendly cavity for perching ducks to nest. The system uses inexpensive and easily removable components requiring only minimal effort to replace. The modular nature of the nesting system of the present subject matter allows users to purchase an initial set-up kit (including all components needed to set-up a system) and thereafter incur minimal expense, to replace system components. Field tests of prototypes of the present subject matter have shown there are few negative issues with currently fielded systems. The solution eliminates using latches and access doors that degrade over time, and the lightweight nature of my invention eliminates time-consuming and laborious maintenance.

BRIEF DESCRIPTION OF THE DRAWINGS

Throughout the drawing figures and the detailed description below, I shall use similar reference numerals to refer to similar components of the present subject matter.

DETAILED DESCRIPTION OF THE INVENTION

Figure 1:
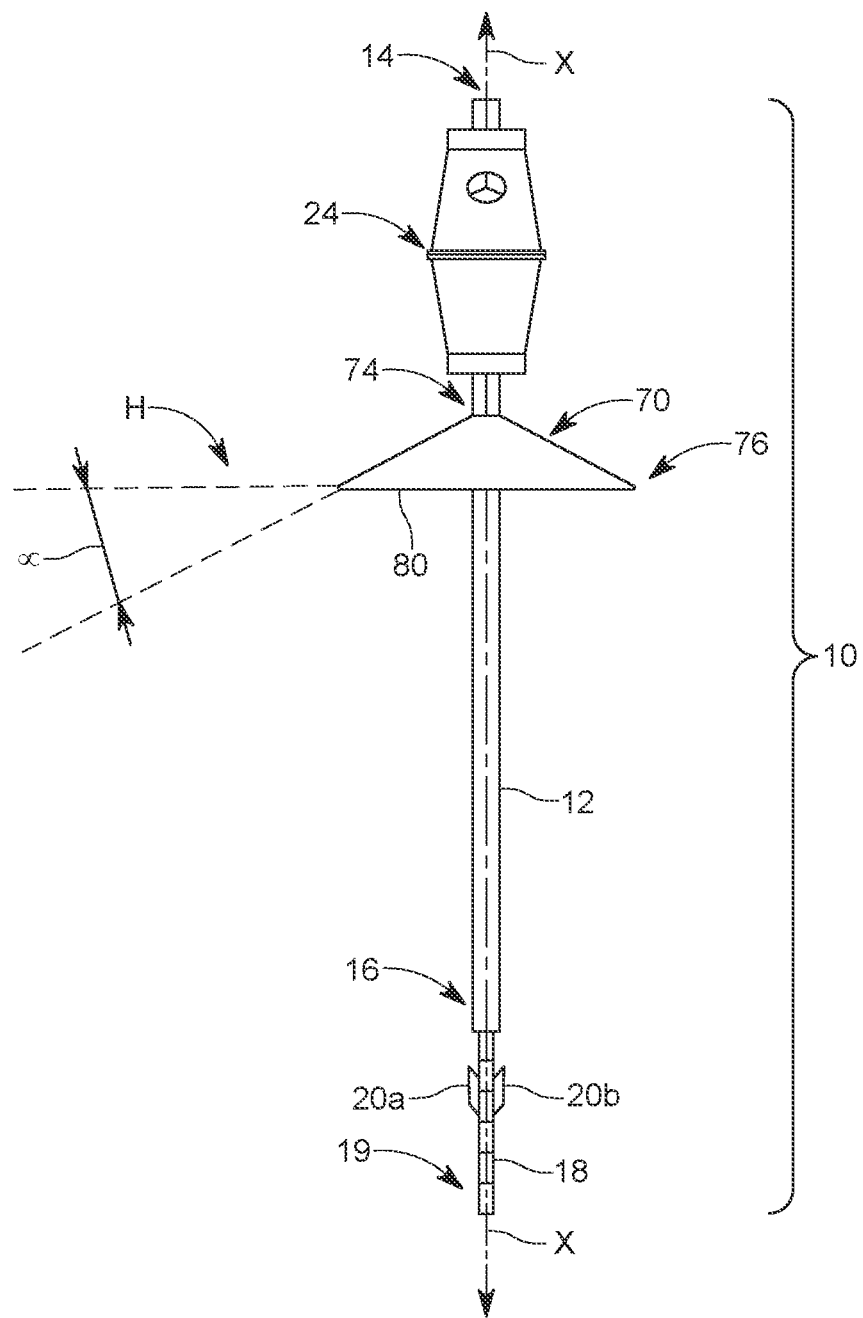
FIG. 1 is a side elevational view of a present embodiment of an easy-to-assemble, ecologically friendly, biodegradable duck nesting system of the present subject matter.
Figure 2:
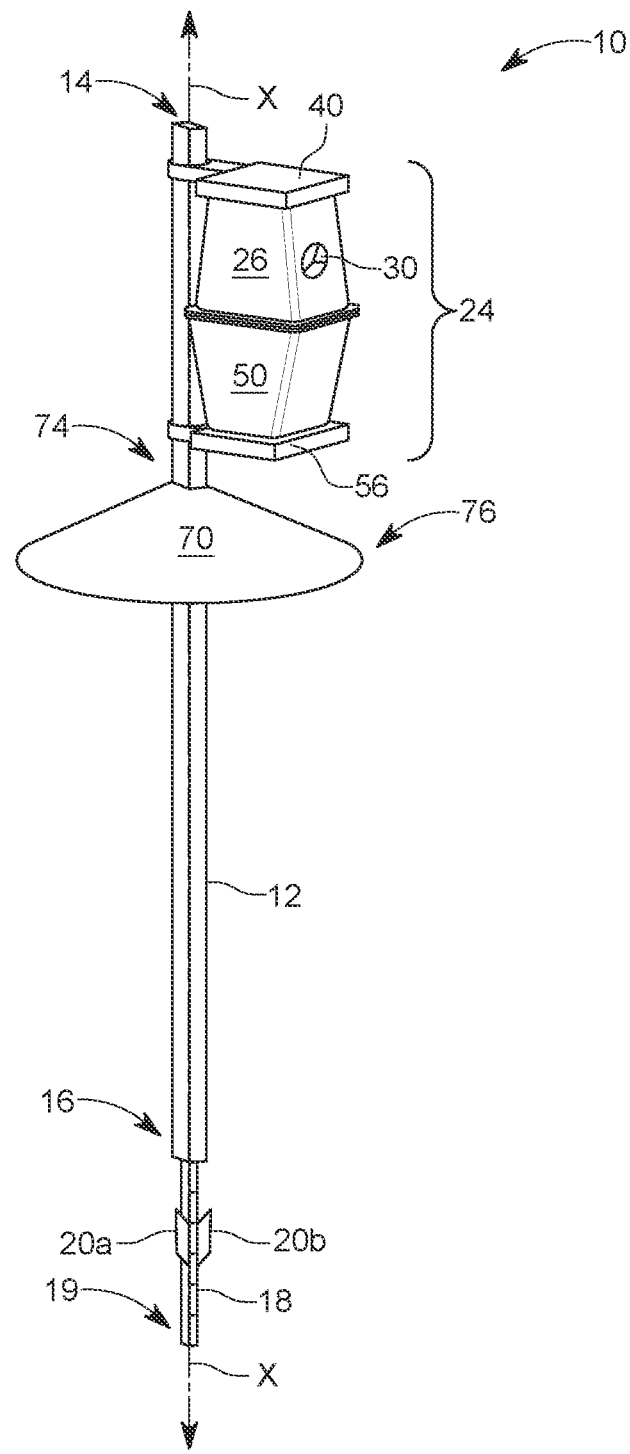
FIG. 2 is a second side elevational view of the nesting system of the present subject matter, rotated about 45 degrees about a vertical axis X-X, viewed from above.
Figure 3:
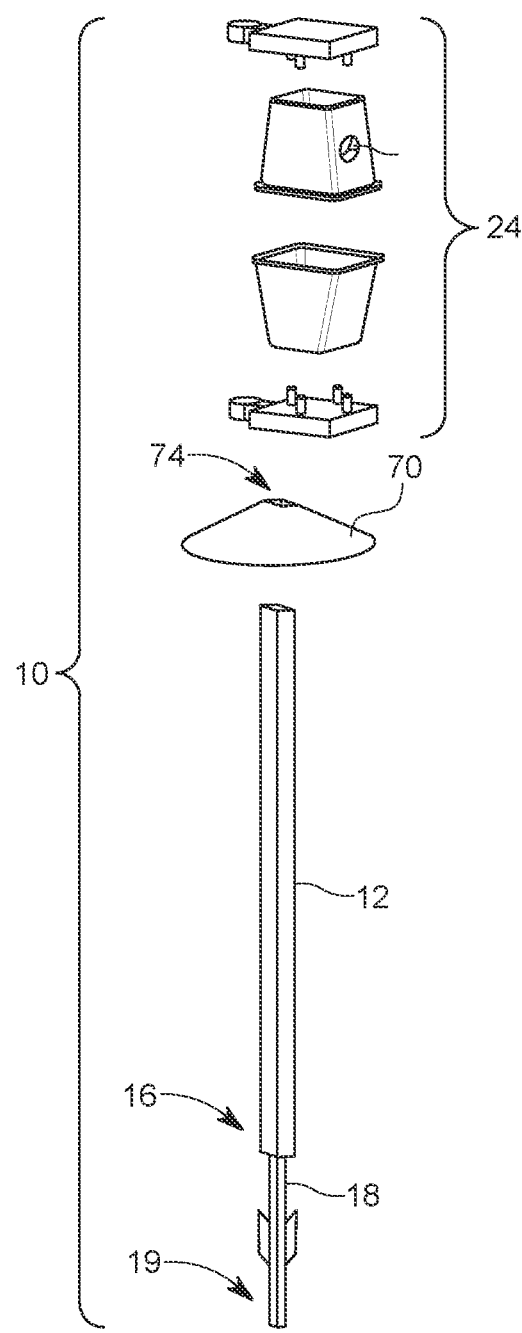
FIG. 3 is an exploded side elevational view, on a reduced scale relative to FIG. 2.

Referring initially to FIGS. 1-3, an embodiment of a biodegradable duck nesting system 10, in accordance with the present subject matter, shall now be described in detail. The system 10 includes a first member 12 having opposite end portions 14 and 16. The first member 12 has a hollow interior between its upper (open) end portion 14 and its lower (open) end portion 16. The duck nesting system 10 also includes a second member 18 having opposite end portions. One of the second member end portions (not visible) is extended (FIGS. 1-3) into the lower (open) end portion 16 of the first member 12. The second member 18, preferably corrosion-resistant, can be made of durable materials including but not limited to polymeric materials such as polypropylene and polyurethane; or such metallic materials as aluminum, or mild carbon steel (preferably zinc-coated or painted to prevent corrosion), or stainless steel. In embodiments of the present subject matter, the second member 18 is a so-called "fence T-post" having radially outwardly extended wings 20*a*, 20*b* for enabling the fence T-post member 18 to be securely fixed in the ground for orienting the first member 12 vertically relative to a horizontal surface.

Figure 4:
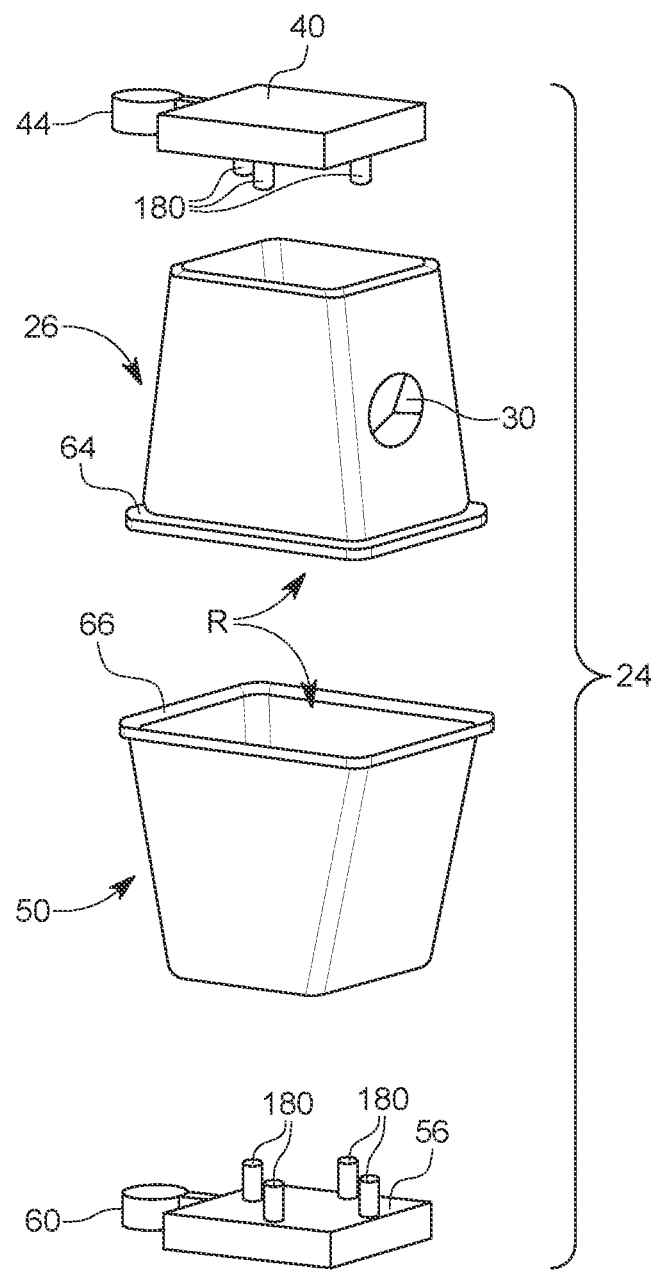
FIG. 4 is an exploded side elevational view, presenting biodegradable components of a nesting system of the present subject matter, on an enlarged scale relative to FIG. 3.

The duck nesting system 10 of the present subject matter is designed to include a biodegradable enclosure 24 (FIGS. 1-3) providing an interior cavity, living space, or region R (FIG. 4) dimensioned and configured for enabling at least two ducks (male and female) to construct a nest, and thereafter raise their fledglings, within the interior space or region.

Referring next to FIGS. 1-4, the biodegradable enclosure 24 includes an upper "pulp pot" housing portion 26 (FIGS. 2, 4) which includes an aperture or opening 30 dimensioned and configured for permitting an adult duck to pass through the opening 30. The upper pulp pot housing portion 26 also includes a roof 40 (FIGS. 2, 4) removably securable to the upper end portion 14 of the first member 12 by ties or clamps 44, preferably made of galvanized steel. The biodegradable enclosure 24 also includes a lower pulp pot housing portion 50 and a floor 56 (FIGS. 2, 4) removably fixed to the first member 12 by additional ties or clamps 60 (FIG. 4), also preferably made of galvanized steel and spaced below the clamps 44 (located at the upper end portion 14 of the first member 12). It is understood that the ties or clamps 44 may be made of variously strong material (metallic or plasticized, for instance) as long as they function has disclosed herein.

In embodiments, the clamps 44, 60 are Simpson strong ties, sized to be 2 and ⅜ inch diameter, made of galvanized steel; the roof 40 and the floor 56 are custom made top and bottom biodegradable components of claw foot construction, each made from 10 inch by 8 inch by 2 inch thick lumber, and each of which includes four dowel rods of ⅝ inch diameter and 2 inches long; and the upper and lower pulp pot housing portions 26, 50 are each the western variety of square pulp pots, each being 12 and ⅜ inches square, with trapezoidal sides, and measuring 11 and ⅛ inches tall. Upper pulp pot housing portion 26 has a lower edge margin 64, and lower housing portion 50 has an upper edge margin 66. When the biodegradable enclosure 24 is assembled, the upper and lower edge margins 64, 66 are joined together to provide an interior cavity, living space, or region R.

The duck nesting system 10 of the present subject matter also includes a predator prevention member 70 (FIG. 2) fixed to an external surface of the first member 12 and spaced between the ground and the enclosure 24. The predator prevention member 70 includes a central aperture or opening 74 dimensioned for enabling first member 12 to extend partially or entirely therethrough. Predator prevention member 70 also includes a peripheral end portion 76 extending a predetermined distance radially outwardly from the central aperture or opening 74, to prevent predators from contacting the enclosure 24.

The first member 12 of the present subject matter is made of a smooth and slippery polymeric material for preventing predators from using it (e.g., climbing up it) to reach the enclosure 24. Slippery polymeric materials, for purposes of the present subject matter, include but are not limited to polytetrafluoroethylene (known by its trademark "TEFLON"), ultrahigh molecular weight polyethylene ("UHMWPE"), and rigid polyvinyl chloride (PVC).

In embodiments of the duck nesting system 10 of the present subject matter, the predator prevention member 70 can be a hollow conical segment 80 (FIG. 1) extending radially outwardly from a vertical axis X-X and downwardly from a horizontal plane H along an acute angle α disposed transverse to the axis X-X. In embodiments, the angle α can range from about 10 degrees to about 40 degrees or can range from about 15 degrees to about 35 degrees or can range from about 20 degrees to about 30 degrees.

How to Assemble Select Components of the Present Subject Matter

Figure 7:
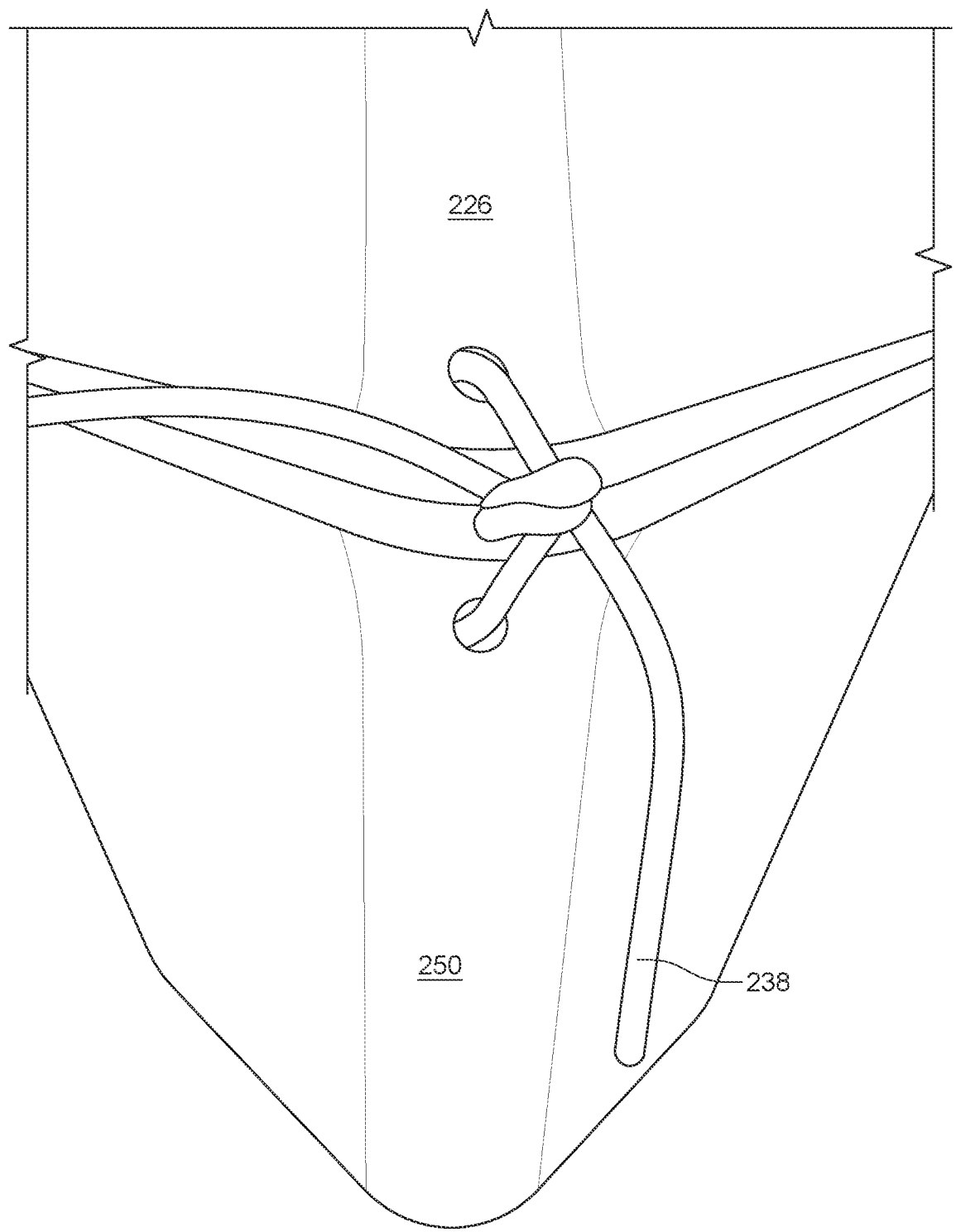
FIG. 7 presents a detailed perspective view of an embodiment of the nesting system illustrating the knots of jute rope 238 into adjacent holes in the upper and the lower pulp pot sections for securing them together.
Figure 8:
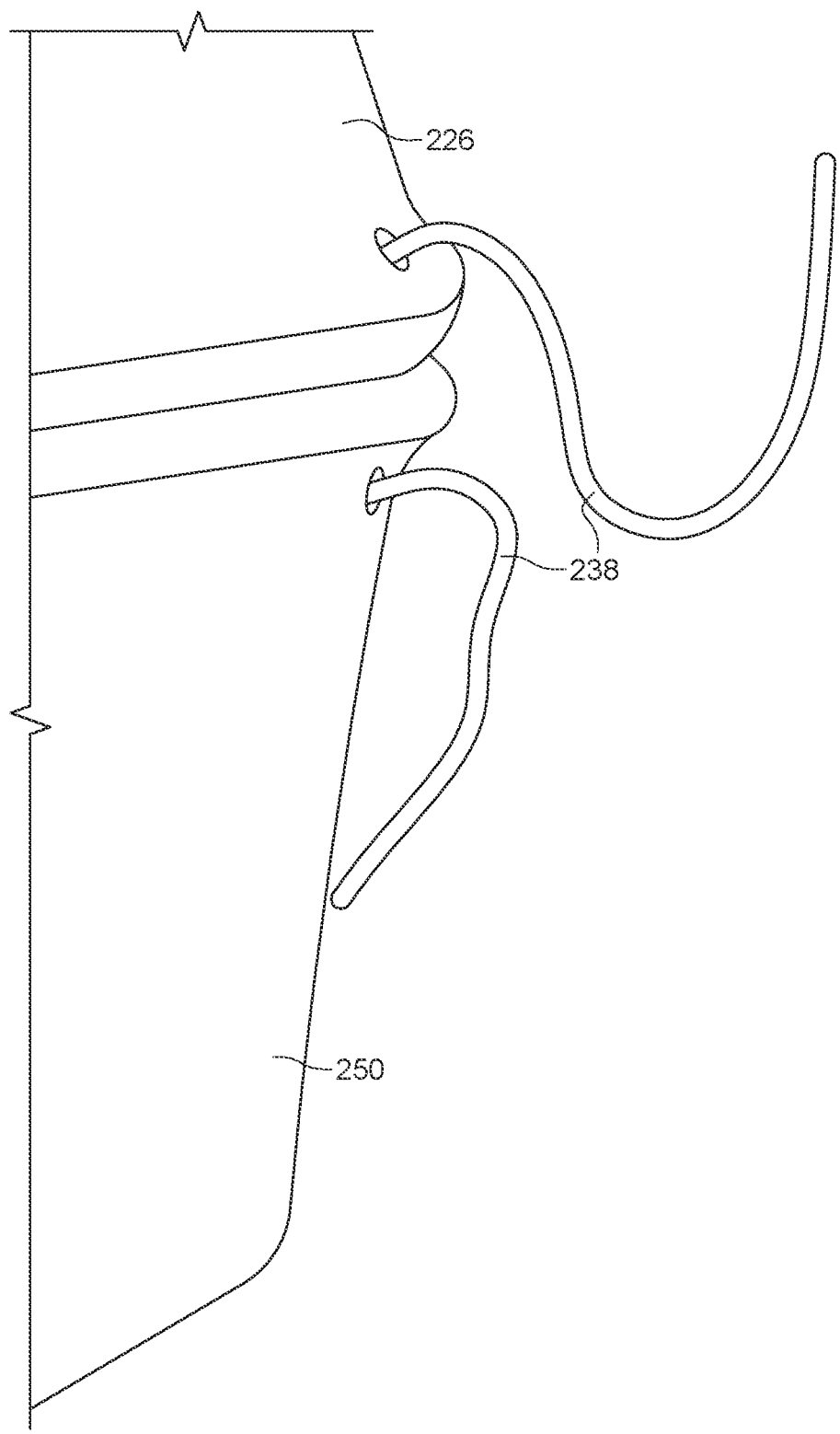
FIG. 8 presents a detailed perspective view of an embodiment of the nesting system illustrating the insertion of jute rope 238 into adjacent holes in the upper and the lower pulp pot sections.

Apply glue (about 4 oz. ("TITEBOND III ULTIMATE) brand waterproof wood glue to the inside of pulp pots 26 and 50, applying a light coating (about 1 handful) of cedar shavings. Allow to dry (about 12 hours). Cedar shavings added at this step enables ducklings to climb out of the enclosure 24. The PVC tubing member 12 is marked to identify the locations of the predator guard or prevention member 70 and the roof or upper claw 40 and the floor or lower claw 56. Place any remaining cedar shavings into the bottom section of the pulp pot 50. Place the top pulp pot section 26 onto the bottom section. Insert jute rope into each of the four holes in the upper and the lower pulp pot sections 26, 50 (as illustrated in FIG. 8). Then tie two over hand knots on each jute rope piece to secure the top and bottom (as illustrated in FIG. 7). [.] This creates a secure pulp box that will serve as the nest structure. Secure the floor 56 to create a base for the nest structure (which consists of the upper and lower housing portions 26, 50). Then place the nest structure onto the floor 56 by aligning the bottom holes in the structure with wooden dowels 180 extending from the floor 56. Install the roof 40 with its downwardly extending dowels 180 into upper holes in the structure, and then secure the nesting structure in place. This fixes the structure in place on the PVC pole 12. The predator guard 70 is then fixed below the nesting structure by sliding the predator guard 70 along the PVC pipe 12 to the previously measured location and tightening down. At this point the assembly is completed and ready to install. A user will thereafter transport a T-post to a desired location and then slide the completed assembly on top of the T-post. The use of jute rope 238 makes the hut system itself is a 100% biodegradable. Each piece of jute rope 238 may be approximately twelve inches of 4 mm jute rope. Though it is understood that the present invention considers other structural elements securing the pulp box (either biodegradable or not, e.g., cable ties) being within the scope of the claimed invention.

Another Embodiment

Figure 5A:
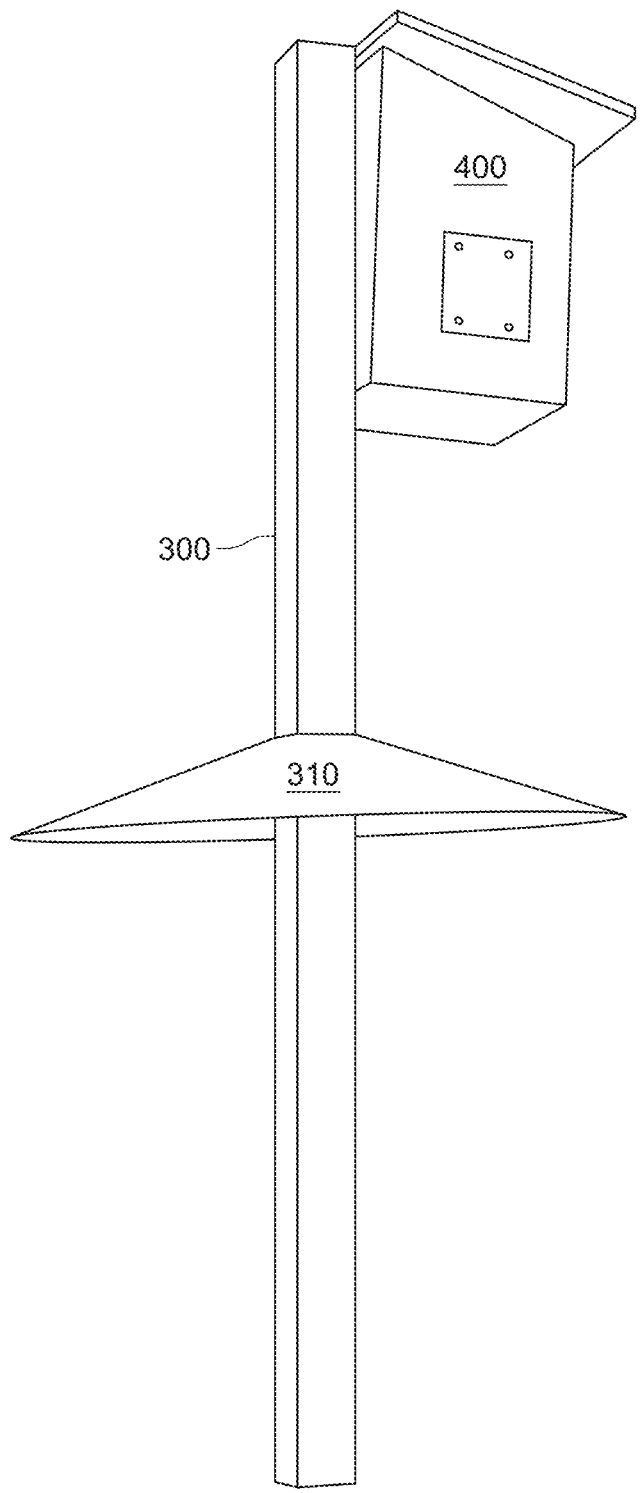
FIG. 5A presents a prior art Duck Box as commonly used in a wetland environment.
Figure 5B:
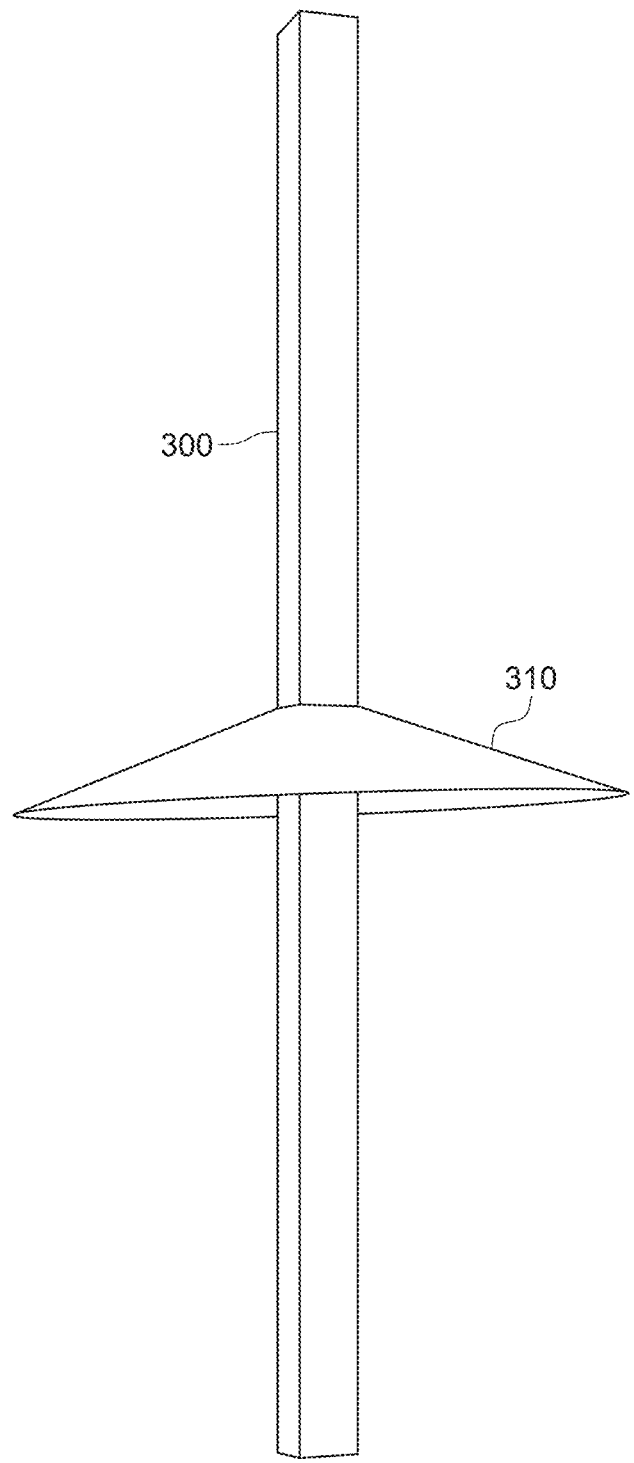
FIG. 5B presents a post shown in FIG. 5A after removal of the prior art Duck Box.
Figure 6A:
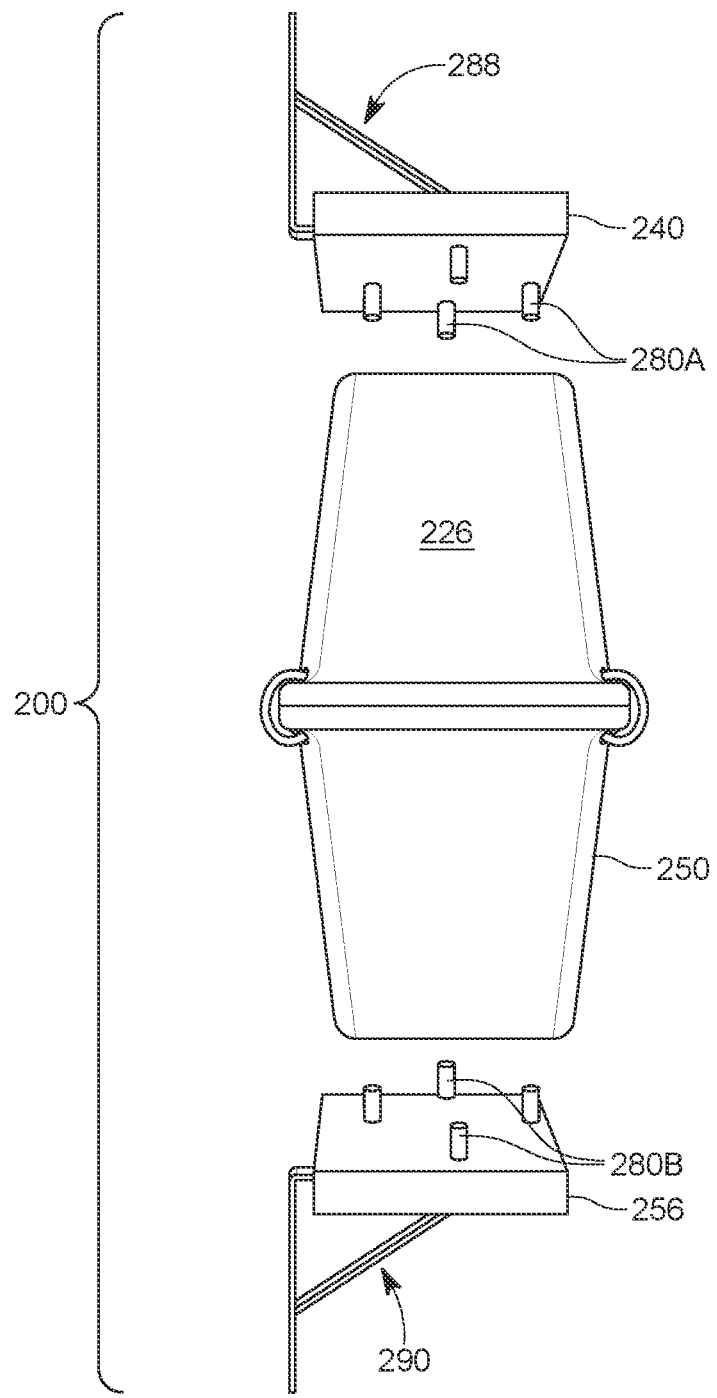
FIG. 6A shows a partly assembled, side elevational view of the nesting system of the present subject matter, on an enlarged scale relative to the exploded view of FIG. 3.

Another embodiment of a biodegradable duck nesting system 200 (FIGS. 6A, 6B) of the present subject matter shall now be described in detail. FIG. 5A presents a prior art Duck Box 400 as commonly used in a wetland environment. FIG. 5B presents a post 300 and a predator prevention member 310 shown in FIG. 5A, after removal of the Duck Box.

This embodiment of the biodegradable duck nesting system 200 (FIGS. 6A, 6B) includes an upper pulp pot housing portion 226 fixed to a lower pulp pot housing portion 250. A roof 240 is removably fixed to the upper portion 226 by four spaced-apart dowels 280A. A floor 256 is similarly removably affixed to lower portion 250 by four dowels 280B.

Figure 6B:
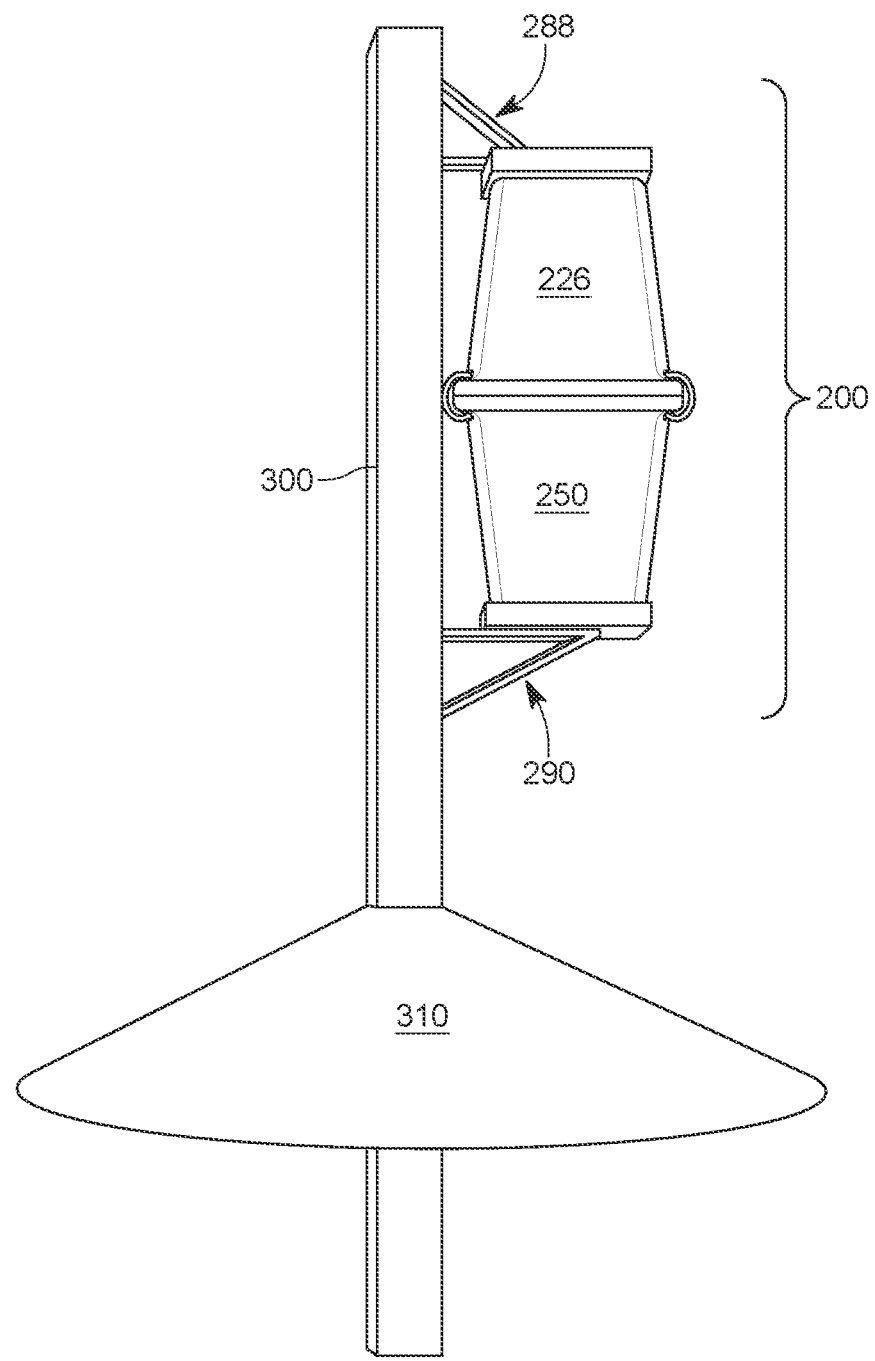
FIG. 6B presents a side elevational view of an embodiment of the nesting system shown in FIG. 6A, with the system fixed to an upper portion of the post shown in FIG. 5B.

An upper conventional bracket 288, removably fixed to the roof 240 (FIG. 6A), is used to secure an upper portion of the biodegradable duck nesting system 200 of the present subject matter to the post 300; and a conventional lower bracket 290, removably fixed to the floor 256 (FIG. 6A), is used to secure a lower portion of the duck nesting system 200 to the post 300 above the predator prevention member 310 (FIGS. 5B, 6B).

In this way, a biodegradable duck nesting system 200 (FIGS. 6A, 6B) of the present subject matter can be used in place of a prior art Duck Box 400 in a wetland environment.

Components of the present subject matter include a biodegradable enclosure defining an interior space dimensioned for enabling at least two mature ducks to nest and raise their fledglings inside. The enclosure comprises an upper housing portion and a lower housing portion. The upper housing portion has an aperture sized and configured to permit a mature duck to pass through it and includes a roof removably fixed to the upper housing portion. The lower housing portion includes a floor removably fixed to it.

Regarding The Present Subject Matter

The biodegradable duck nesting system of the present subject matter may help migratory wood ducks to survive. There are two problems to be solved to achieve their survival. The first and most important problem is keeping predators, primarily raccoons, and water snakes, away from the nest during the incubation of their eggs. The second is providing a duck nesting structure that is inexpensive and easy to maintain, for enabling environmentalists and wildlife advocates and enthusiasts to increase wood duck populations in wilderness areas. The present subject matter is advantageously designed for use in an urban or suburban environment. Wood ducks will migrate to a neighborhood backyard if there is a pond, river, or creek within 1 and ½ miles from a nest. Wood ducks have been observed hatching in hollowed out tree trunks in city parks and then traveling overland with their fledglings, distances up to 1 and ½ miles, to get to the nearest pond. Wood ducks are wild migratory waterfowl that some folks, on occasion, may see. There was a time when there were sufficient old hollowed out tree trunks for wood ducks to find their own nest. However, as wetlands and old growth forests have diminished with the development of housing sites and factory locations, wood duck populations have become decimated. Numerous individuals and waterfowl associations have sought solutions to increase wood duck populations to prevent their extinction. The present subject matter was designed to solve those problems. Raccoons and water snakes are notorious predators to the wood duck. Raccoons eat the eggs and may at times eat the fledglings, before they can hatch and jump out of the nest. I have observed that a predator prevention member such as the member 70 (FIGS. 1-3) or the member 310 (FIGS. 5B, 6B) prevents raccoons and water snakes from getting into a biodegradable enclosure 24 (FIG. 4), or the biodegradable duck nesting system 200 (FIGS. 6A, 6B) of the present subject matter.

As FIGS. 5B, 6B show, a common 4×4 inch post can be used in connection with the present subject matter. I prefer to use a PVC pole since it is cheaper than lumber and lightweight. It also can easily be slid over a top of a T-post member 18 (FIG. 1), making maintenance of the biodegradable enclosure 24 (FIG. 4) or biodegradable duck nesting system 200 (FIGS. 6A, 6B) of the present subject matter very easy. One simply slides the PVC pole off the T-post member 18, enabling all the maintenance required to be done from the ground, without needing to use a ladder which can be very dangerous in swampy areas. No other system now on the market can be lowered to the ground for maintenance.

ADDITIONAL EMBODIMENTS

As I pondered scope of my invention, I changed the original concept. For instance, instead of calling my prototype a "Duck Box," I now call my prototype a "Duck Hut," since the word "box" suggests "made of wood," while my enclosure, in comparison, comprises upper and lower joined housing portions, each made entirely of biodegradable materials.

In addition, my "Duck Hut" is much easier to maintain than the common sort of "Duck Box" people may have constructed and used, or purchased, for 100 years or more.

My objective in seeking patent protection is threefold. First, as described in detail, my Duck Hut can be mounted on a PVC pole with a predator shield sized and configured to slide over a T-Post and along the pole. Second, I plan to sell biodegradable enclosures as a secondary product, in "kit" form, enabling people to convert Duck "Boxes" into "Huts."

Substituting one of my entirely biodegradable "huts" for a common wooden "box" is quite simple. Components of a biodegradable "hut" consist essentially of upper and lower pulp pots, optional components might include wooden floor, roof, and dowels; and additional optional components might include the angle brackets, top and bottom. Thus, a person can attach a duck hut to an existing wood post with three, e.g., screws at a top and, e.g., three screws at a bottom. This would allow me to sell my biodegradable "huts" to people who already have wood duck "boxes" and wish to convert them to duck "huts."

Third, with respect to the biodegradable "hut" itself, I have contemplated modifying this design, for purposes of expanding my market, whereby the above described 3-inch by 4-inch opening 30 (FIGS. 2, 4) dimensioned and configured for perching ducks, would instead be dimensioned and configured, e.g., to have a 3-inch circumference opening, thereby marketing this version of my biodegradable "hut" as an enclosure for squirrels.

A customer could, for example, buy a biodegradable squirrel "hut" kit from my store, assemble a biodegradable squirrel "hut" from that kit, and mount the assembled squirrel "hut" to a tree for squirrels to nest in. Squirrels shall not require a predator guard.

Closing Remarks

What has been illustrated and described in this nonprovisional patent application is a biodegradable duck nesting system including a biodegradable enclosure consisting essentially of attached upper and lower portions. While the present subject matter was described in relation to several embodiments, the present subject matter is not limited to these embodiments. On the contrary, many alternatives, changes, and/or modifications will become apparent to a person of ordinary skill in the art ("POSITA") after this patent application has been reviewed in connections with its accompanying FIGS. Therefore, all such alternatives, changes, and/or modifications are to be viewed as forming a part of the present subject matter insofar as they fall within the spirit and scope of appended claims.

I claim:

1. A biodegradable duck nesting system mountable in the ground, comprising:
   a first member having an upper end portion and an opposing lower end portion and defining a hollow interior therebetween, wherein the first member is made of a smooth, slippery polymeric material;
   a second member having opposite end portions, wherein one of the second member end portions extends into the hollow interior of the first member and the another of the second member end portions is fixable in a predetermined distance into a horizontal surface for enabling the first member to be oriented vertically relative to the horizontal surface;

a biodegradable enclosure defining an interior space sized for enabling at least two ducks to nest and raise their fledglings therein, wherein the enclosure comprises:

an upper housing portion defining an aperture sized and configured to permit a duck to pass therethrough, the upper housing portion including a roof removably securable to the upper end portion of the first member, and a lower housing portion including a floor that is removably secured to the first member and spaced from the upper end portion of the first member; and a predator prevention member spaced between the horizontal surface and the enclosure, wherein the predator prevention member defines a central aperture dimensioned and configured for passing the first member therethrough, wherein the predator prevention member includes a peripheral end portion extending a predetermined distance radially outwardly from the central aperture, to prevent predators from contacting the enclosure.

2. The duck nesting system of claim 1, wherein the first member is made of PVC.

3. The duck nesting system of claim 1, wherein the predator prevention member defines a hollow conical segment extending radially outwardly from a vertical axis and downwardly from a horizontal plane along an acute angle disposed transverse to the axis.

4. A biodegradable enclosure defining an interior space dimensioned and configured for enabling at least one wild animal to reside therein, comprising:

an upper housing section made of biodegradable materials, the upper housing section defining an aperture sized and configured to permit the at least one wild animal to pass therethrough, the upper housing section including a roof removably fixed to an upper portion of the upper housing section, a lower housing section made of biodegradable materials, the lower housing section including a floor removably fixed to a lower portion thereof, wherein the upper housing section and the lower housing section have a lower edge margin and an upper edge margin, respectively, wherein each edge margin comprises a lip projecting radially outward from an edge of the respective housing section, and a rope interwoven through the lips of the lower and upper edge margins joined together to define said interior space.

5. The biodegradable enclosure of claim 4, wherein the upper and lower housing sections are secured together.

6. The biodegradable enclosure of claim 4, wherein the at least one wild animal is a duck.

7. The biodegradable enclosure of claim 4, wherein the at least one wild animal is a perching duck.

8. The biodegradable enclosure of claim 4, wherein the at least one wild animal is a squirrel.

9. The biodegradable enclosure of claim 4, wherein the rope is jute rope.

10. The biodegradable enclosure of claim 4, further comprising an elongated member having opposite end portions, wherein one of the elongated member end portions extends adjacent the biodegradable enclosure and another of the elongated member end portions is fixable in a predetermined distance into a horizontal surface for enabling the biodegradable enclosure to be oriented vertically relative to the horizontal surface.

11. The biodegradable enclosure of claim 10, further comprising a predator prevention member spaced between the horizontal surface and the biodegradable enclosure, wherein the predator prevention member defines a central aperture dimensioned and configured for passing the elongated member therethrough, wherein the predator prevention member includes a peripheral end portion extending a predetermined distance radially outwardly from the central aperture, to prevent predators from contacting the biodegradable enclosure.

12. The biodegradable enclosure of claim 11, further comprising, for each the roof and the floor, a clamp operatively associated thereto, wherein each clamp is configured to slidably receive the elongated member.

13. The biodegradable enclosure of claim 11, further comprising, for each the roof and the floor, a bracket directly connected thereto, wherein each bracket is configured to directly connect to the elongated member.

* * * * *